United States Patent
Keith et al.

(10) Patent No.: US 9,785,986 B2
(45) Date of Patent: *Oct. 10, 2017

(54) METHOD FOR AUTOMATING ONBOARDING OF USER GENERATED RINGBACK TONES TO SALES DISTRIBUTION CHANNEL

(71) Applicant: AT&T Intellectual Property I, L.P., Reno, NV (US)

(72) Inventors: Chad C. Keith, San Antonio, TX (US); David Dunmire, San Antonio, TX (US); Clifford Marcus Owenby, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 901 days.

This patent is subject to a terminal disclaimer.

(21) Appl. No.: 13/654,505

(22) Filed: Nov. 19, 2012

(65) Prior Publication Data
US 2013/0138522 A1    May 30, 2013

Related U.S. Application Data

(63) Continuation of application No. 12/847,793, filed on Jul. 30, 2010, now Pat. No. 8,315,920, which is a continuation-in-part of application No. 12/720,300, filed on Mar. 9, 2010, now abandoned.

(51) Int. Cl.
*G06Q 30/00* (2012.01)
*G06Q 30/06* (2012.01)
*H04M 3/42* (2006.01)

(52) U.S. Cl.
CPC ......... *G06Q 30/0601* (2013.01); *G06Q 30/06* (2013.01); *H04M 3/42017* (2013.01)

(58) Field of Classification Search
CPC .............................. G06Q 17/30; G06Q 30/00
See application file for complete search history.

(56) References Cited

U.S. PATENT DOCUMENTS

| | | | |
|---|---|---|---|
| 5,404,488 A | 4/1995 | Kerrigan et al. | |
| 6,993,580 B2 | 1/2006 | Isherwood et al. | |
| 6,993,707 B2 | 1/2006 | Baker et al. | |
| 7,103,351 B2 | 9/2006 | Chaudhari et al. | |
| 7,142,645 B2 * | 11/2006 | Lowe ................ | G06F 17/30017 379/68 |
| 7,254,387 B2 | 8/2007 | Dunlop et al. | |
| 7,299,500 B1 | 11/2007 | Klebe et al. | |
| 7,533,144 B2 | 5/2009 | Kassab | |

(Continued)

OTHER PUBLICATIONS

Dave in Decatur "Finding all ringtones on Samsung Stratosphere", Verizon Community, dated Dec. 28, 2011.*

(Continued)

*Primary Examiner* — Mark Fadok
(74) *Attorney, Agent, or Firm* — Baker & Hostetler LLP

(57) ABSTRACT

A method for automating an onboarding process for a developer onto a service delivery hub operated by a network operator includes providing the developer with information relating to use of the service delivery hub, receiving data relating to the developer, approving the developer, certifying an application provided by the developer, and configuring the application for use. A method for synchronization with the service delivery hub is also provided.

12 Claims, 11 Drawing Sheets

(56) References Cited

U.S. PATENT DOCUMENTS

| | | |
|---|---|---|
| 7,716,077 B1 | 5/2010 | Mikurak |
| 7,752,080 B1 | 7/2010 | Greener |
| 7,752,292 B1 | 7/2010 | Katzer |
| 7,870,293 B2 | 1/2011 | Tso |
| 7,912,445 B2 | 3/2011 | Maes |
| 7,941,557 B2 | 5/2011 | Zhu et al. |
| 7,971,562 B2 | 7/2011 | Cheng et al. |
| 7,995,728 B1* | 8/2011 | Martin ............... H04M 3/42017 379/201.02 |
| 8,027,444 B1* | 9/2011 | Martin ............... H04M 3/42017 379/201.01 |
| 8,032,397 B2 | 10/2011 | Lawless |
| 8,085,929 B2* | 12/2011 | Subramaniam ... H04M 3/42017 370/352 |
| 8,086,219 B2 | 12/2011 | O'Neil et al. |
| 8,099,316 B2 | 1/2012 | Moukas et al. |
| 8,112,494 B2 | 2/2012 | Maghraby |
| 8,126,126 B2* | 2/2012 | Haley ............... H04M 3/42017 379/201.01 |
| 8,126,722 B2 | 2/2012 | Robb et al. |
| 8,160,916 B2 | 4/2012 | Moukas et al. |
| 8,175,252 B2* | 5/2012 | Batni ............... H04M 3/42017 379/201.01 |
| 8,204,202 B2 | 6/2012 | Tao |
| 8,249,239 B2* | 8/2012 | DeMent ............ H04M 3/42017 379/207.16 |
| 8,280,356 B2* | 10/2012 | Inapakolla ............... H04M 3/42 379/201.02 |
| 8,306,518 B1* | 11/2012 | Gailloux ............. H04L 41/0813 379/201.12 |
| 8,315,920 B2 | 11/2012 | Dunmire |
| 8,359,398 B1 | 1/2013 | Edwards et al. |
| 9,185,239 B2* | 11/2015 | Dinoff ................. H04M 19/04 |
| 9,232,077 B2* | 1/2016 | Yu .......................... H04L 12/14 |
| 2001/0005372 A1 | 6/2001 | Cave |
| 2002/0087661 A1 | 7/2002 | Matichuk et al. |
| 2002/0138331 A1 | 9/2002 | Hosea et al. |
| 2003/0032409 A1 | 2/2003 | Hutcheson et al. |
| 2003/0105825 A1 | 6/2003 | Kring et al. |
| 2003/0105955 A1 | 6/2003 | Carroll et al. |
| 2003/0120502 A1 | 6/2003 | Robb et al. |
| 2003/0151619 A1 | 8/2003 | McBride |
| 2003/0158930 A1 | 8/2003 | McBride |
| 2004/0073713 A1 | 4/2004 | Pentikainen et al. |
| 2004/0148229 A1* | 7/2004 | Maxwell ............ G06Q 30/0277 705/14.73 |
| 2004/0181591 A1* | 9/2004 | Yu .......................... H04L 12/14 709/217 |
| 2005/0015340 A1 | 1/2005 | Maes |
| 2005/0034063 A1 | 2/2005 | Baker et al. |
| 2005/0117726 A1* | 6/2005 | DeMent ............ H04M 3/42017 379/142.01 |
| 2005/0185918 A1* | 8/2005 | Lowe ................. G06F 17/30017 386/228 |
| 2005/0186953 A1* | 8/2005 | Harris ..................... H04M 1/04 455/419 |
| 2005/0221793 A1* | 10/2005 | Chin .................. H04M 3/42017 455/401 |
| 2006/0167805 A1 | 7/2006 | Manthoulis et al. |
| 2006/0241986 A1 | 10/2006 | Harper |
| 2006/0268896 A1 | 11/2006 | Kotola et al. |
| 2006/0287958 A1* | 12/2006 | Lundblade ................. G06F 8/61 705/57 |
| 2007/0003047 A1* | 1/2007 | Batni ................. H04M 3/42017 379/215.01 |
| 2007/0027784 A1 | 2/2007 | Kahn, IV et al. |
| 2007/0047523 A1 | 3/2007 | Jiang |
| 2007/0130505 A1 | 6/2007 | Woods |
| 2007/0161412 A1* | 7/2007 | Nevid .................... H04M 19/04 455/567 |
| 2007/0168462 A1* | 7/2007 | Grossberg .............. G06Q 30/02 709/217 |
| 2007/0173236 A1* | 7/2007 | Vishwanathan ........ G06Q 30/02 455/414.1 |
| 2007/0189488 A1* | 8/2007 | Stoops ............... H04M 3/42017 379/207.16 |
| 2007/0208574 A1 | 9/2007 | Zheng et al. |
| 2007/0218877 A1* | 9/2007 | Mills ................. H04M 3/42017 455/414.1 |
| 2007/0286402 A1* | 12/2007 | Jacobson .......... H04M 3/42017 379/372 |
| 2007/0287454 A1 | 12/2007 | Zhu et al. |
| 2007/0291931 A1* | 12/2007 | DeMent ............ H04M 3/42017 379/418 |
| 2008/0063168 A1* | 3/2008 | Haley ............... H04M 3/42017 379/201.01 |
| 2008/0065507 A1* | 3/2008 | Morrison ........... G06Q 30/0613 705/26.3 |
| 2008/0154656 A1 | 6/2008 | Kail et al. |
| 2008/0273689 A1* | 11/2008 | Dinoff .................... H04M 19/04 379/375.01 |
| 2008/0275980 A1 | 11/2008 | Hansen |
| 2009/0019535 A1 | 1/2009 | Mishra et al. |
| 2009/0131025 A1 | 5/2009 | Sharma et al. |
| 2009/0138563 A1 | 5/2009 | Zhu et al. |
| 2009/0156213 A1 | 6/2009 | Spinelli et al. |
| 2009/0185669 A1 | 7/2009 | Zitnik et al. |
| 2009/0199230 A1 | 8/2009 | Kumar |
| 2009/0210702 A1* | 8/2009 | Welingkar ............... H04L 9/321 713/156 |
| 2009/0296930 A1 | 12/2009 | Krantz et al. |
| 2010/0014647 A1* | 1/2010 | Subramaniam ... H04M 3/42017 379/87 |
| 2010/0030651 A1* | 2/2010 | Matotek ............. G06Q 20/105 705/17 |
| 2010/0042688 A1 | 2/2010 | Maghraby |
| 2010/0077321 A1 | 3/2010 | Shen et al. |
| 2010/0080361 A1 | 4/2010 | Houghton |
| 2010/0138480 A1 | 6/2010 | Benedetto |
| 2010/0159913 A1* | 6/2010 | Tong ......................... H04M 3/02 455/420 |
| 2010/0280962 A1 | 11/2010 | Chan |
| 2010/0292556 A1 | 11/2010 | Golden |
| 2011/0029875 A1* | 2/2011 | Milch .................... B60R 25/104 715/727 |
| 2011/0092191 A1* | 4/2011 | Inapakolla ............... H04M 3/42 455/414.1 |
| 2011/0131408 A1 | 6/2011 | Cook et al. |
| 2011/0225060 A1 | 9/2011 | Dunmire |
| 2011/0225320 A1 | 9/2011 | Keith et al. |
| 2011/0225636 A1 | 9/2011 | Keith |
| 2012/0017253 A1* | 1/2012 | Hicks, III ............ H04N 21/4122 725/114 |
| 2012/0030019 A1 | 2/2012 | Dunmire |
| 2012/0030478 A1 | 2/2012 | Dunmire |
| 2012/0030774 A1 | 2/2012 | Keith |
| 2014/0337148 A1* | 11/2014 | Kannan .................... G06Q 30/02 705/14.73 |

OTHER PUBLICATIONS

Kushan, Mitra, "The next 400 million; Though voice still remains the money spinner, telecom operators and handset makers are betting big on services to acquire the next 400 million customers. Kushan Mitra goes into the details", Business Today. New Delhi: May 3, 2009.

M2 Presswire, "IMimobile: IMimobile Announces First Fully Integrated MobileAd Platform", Coventry: Jan. 22, 2008. p. 1.

\* cited by examiner

METHOD FOR AUTOMATING ONBOARDING OF USER GENERATED RINGBACK TONES TO SALES DISTRIBUTION CHANNEL

CROSS REFERENCE TO RELATED APPLICATIONS

This application is a continuation of, and claims priority to, U.S. patent application Ser. No. 12/847,793, filed Jul. 30, 2010. U.S. patent application Ser. No. 12/847,793 is a continuation-in-part of, and claims priority to, U.S. patent application Ser. No. 12/720,300, filed Mar. 9, 2010. U.S. patent application Ser. No. 12/847,793 is incorporated by reference herein in its entirety. U.S. patent application Ser. No. 12/720,300 is incorporated by reference herein in its entirety.

TECHNICAL FIELD

This invention is directed to a service delivery platform, and more particularly, to a system, apparatus, and method for providing third party application developers and users efficient and automated access to a service delivery platform to provide ring-back tones and other content, and the networks and portals connected thereto.

BACKGROUND

Third party application service providers often require access to telecommunications services in order to exercise their respective business models. Traditionally, network operators have been able to develop systems and processes for providing third parties such desired access. Service delivery platforms created by network providers and tied to the network are used to provide native services to application service providers. Such service delivery platforms become an economical and efficient mechanism for providing network access.

The problem is that the functionality of service delivery platforms is very limited, most often to access, bandwidth and load control, and security with little other functionality provided. Moreover, service delivery platforms are local to the networks being accessed, meaning third party developers need to negotiate agreements and replicate their solution on multiple delivery platforms. The limited nature of service delivery platforms is especially difficult in the wireless telecommunications industry where rich network functionality is developing and becoming available yet not accessible to the third party developers. Thus there is a need for a full function service delivery platform which provides additional functionality including monetization, hosting, policy control, storefront sales portals, settlement, reporting, routing, and service management. There is also a need for a centralized service delivery platform to provide a single point of access to application developers to avoid replication of offerings and inefficient use of resources. Finally, there is a need to expand this functionality beyond application service providers to enablers and content aggregators and other third parties.

With respect to ring-back tone platforms, the existing ring-back tone systems are typically closed systems. There is a need to provide open ring-back tone platforms that permit user-generated content to the platform and to provision that content in one network and make it available across multiple networks.

Once the need for the service delivery platform is addressed, there exists a further need to develop and automate processes through which third party developers may access the service delivery platform and take advantage of its functionality in executing its business plan.

SUMMARY

A method for automating an onboarding process for a developer onto a service delivery hub operated by a network operator includes providing the developer with information relating to use of the service delivery hub, receiving data relating to the developer, approving the developer, certifying an application provided by the developer; and configuring the application for use. The providing step includes providing a one of a sample contract for the developer and a questionnaire to the developer, the questionnaire soliciting a concept for a proposed product.

The approval steps includes evaluating a proposed product in consideration of capacity of the service delivery hub. The method further includes automatically synchronizing the service delivery hub with a developer's computer. The method further includes providing the developer with a test environment. A certificate may be provided based on the certification step.

In accordance with another embodiment of the invention, a method for synchronizing a service delivery hub, an application service provider computer and an end point computer includes providing service delivery login credentials to the application service provider (ASP) computer, receiving content metadata from the ASP computer, receiving ASP computer login credentials for the end computer at the service delivery hub, logging in to the end point computer by the service delivery hub on behalf of the ASP computer, and transferring the content metadata to the end point computer. The endpoint computer may be a storefront.

BRIEF DESCRIPTION OF THE DRAWINGS

The following description is better understood when read in conjunction with the appended drawings, wherein.

DETAILED DESCRIPTION OF ILLUSTRATIVE EMBODIMENTS

For the purposes of describing an exemplary embodiment of the invention, reference will be made to the figures set forth above and certain terms. As an aid to the reader, exemplary definitions of such terms are defined as follows:

"Application service provider (ASP)" is a provider which has one or more applications which employ the services of the service delivery hub.

"Aggregator" has relationships to one or more content, application or service providers and manages the access of their respective applications to the service delivery hub.

"Enabler provider (EP)" An enabler provider develops services against its own resources and services with the option to mesh those resources and services with those of the network operator or other enabler providers, for example, a message enabler provider may provide access to WAP push, SMSC, and MMSC services as set forth below.

"On device" applications are applications that are downloadable to a device such as a mobile handset or smart phone.

"Web-hosted based" applications are applications which are sold in a subscription based model and accessed by customer devices.

Figure 1:
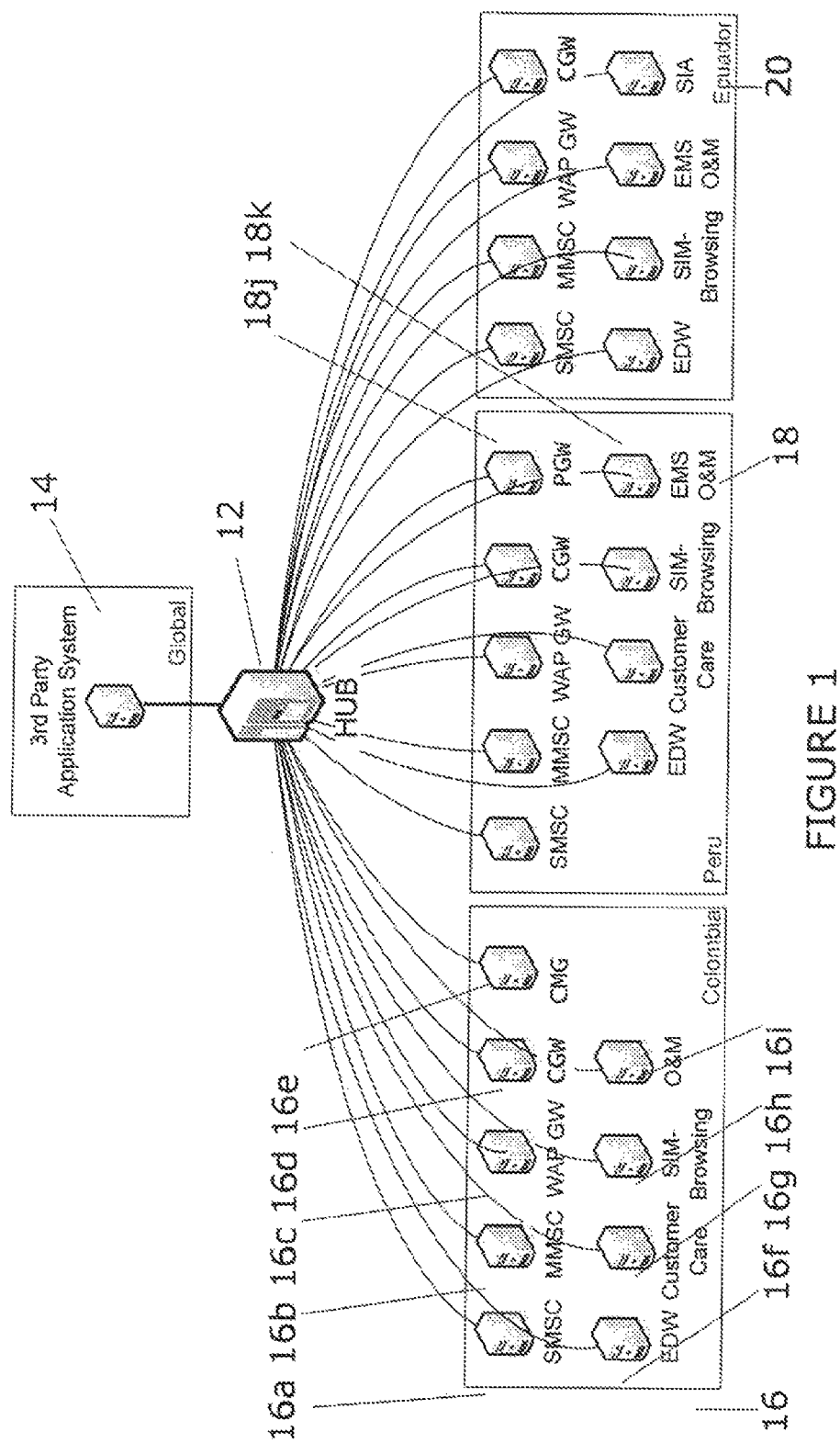
FIG. 1 is a system diagram of a service delivery hub in communication with remote networks.

With reference to FIG. 1, there is shown a system 10 having a service delivery hub 12 in communication with network operations 16, 18, and 20. As described more fully herein, the service delivery hub 12 provides a central access point for third party ASPs, aggregators, and enabler providers and includes a set of application programming interfaces (APIs) provided by the network provider or enabler providers. The service delivery hub 12 also includes a charging gateway which provides the capability for third parties to monetize their applications and a settlement center which balances accounts of multiple parties and network operators in accordance with contractual fee splitting arrangements or other mechanisms determined by the parties, so-called recursive settlements. The service delivery hub 12 also includes a control center to manage access to the system.

Referring again to FIG. 1, there is shown a third party application server 14 in communication with the service delivery hub 12. The service delivery hub 12 is targeted to produce an integration layer for access to the network operations 16, 18, and 20, specifically network elements, operational support systems and business support systems (OSS/BSS), and Internet application service providers (ASPs). The network operations 16, 18, and 20 (also referred to as networks herein) are illustrative only and may vary in number from one to many networks. The networks may be stand alone networks in a particular geographic area, which areas may be delineated on a country or state basis or any other geographic distinction. The networks may also be delineated by network operator or network type. There may also be more than one network in any one geographic region.

In the exemplary embodiment of FIG. 1, network operations 16 are designated as being in the country of Columbia, network operations 18 in Peru, and network operations 20 in Ecuador. Within each network operations 16, 18, 20, there is shown a representative sample of network subsystems contained therein and, in the case of network operations 16 in Columbia, shown numbered as 16a-16. Those subsystems within network operations 16 include the short message service center (SMSC) 16a, multi-media service center (MMSC)16b, wireless access protocol (WAP) gateway 16c, a charging gateway labeled (CGW)16d, a charging and messaging gateway (CMG) used by aggregators+ 16e, enterprise data warehouse (EDW) 16f, customer care 16g, subscriber interface module (SIM) browsing 16h, and operations and maintenance (O&M)16. It will be understood by those skilled in the art that the identification of such subsystems is representative and is not meant to specify any one type of proprietary system and that each country or location may have its own instance of such subsystems. Moreover, not all subsystems are necessarily found in each network operations 16, 18, 20 and there may be other subsystems not listed above, for example, profile gateway (PGW) 18j, and emergency management systems (EMS) 18k are illustrated as part of network operation 18 but not as part of network operation 16.

The service delivery hub 12 exposes access to third party applications to network services provided by the network subsystems. The service delivery hub 12 supports third party developed services and controls application usage of network operations and third party services. It is preferred that the service delivery hub 12 employ industry standards known to those skilled in the art or to be developed by the industry, including but not limited to Parlay X, SOAP, REST, HTTPS, JKD 1.5, XML, SSL+X509 certification for transport security, and WSSE username token profile security.

The service delivery hub 12, has interfaces into each of the subsystems within network operations 16, 18, 20. An exemplary methodology for using those interfaces may include establishing a VPN tunnel from the service delivery hub 12 to the subsystem of interest. Thus, if an application residing on the third party application system server 14 desires access to SMSC 16a, the service delivery hub 12 will establish a VPN tunnel or other connection to SMSC 16a thereby providing the application access to SMSC 16a.

Figure 3:
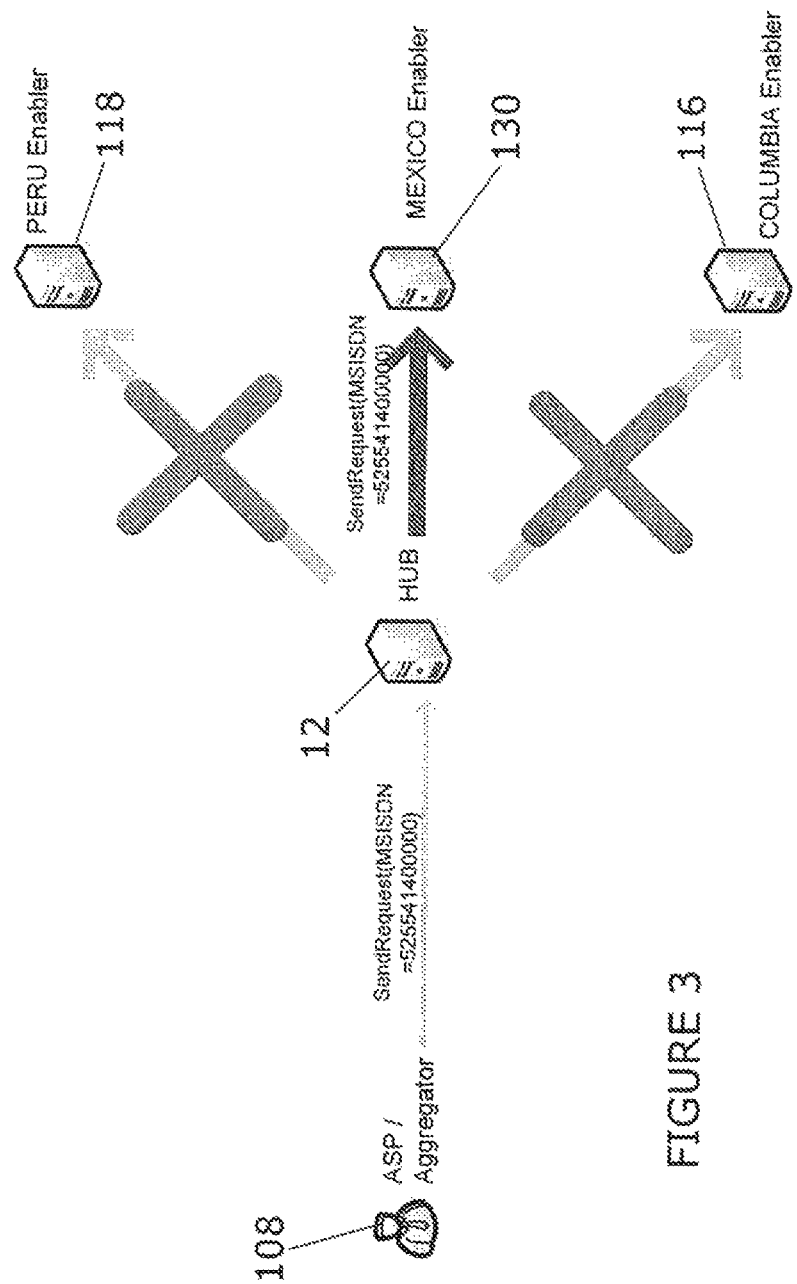
FIG. 3 is a block diagram illustrating the routing control function of the service delivery hub.

An example of this routing is shown in FIG. 3. In that example, an aggregator 108 is utilizing the service delivery hub 12 to access an enabler 130 located in Mexico through an API provided by enabler 130 and made available to aggregator 108 through service delivery hub 12. The aggregator will send a request message to the service delivery hub 12 which includes an identifier, in this case, a MSISDN. The service delivery hub 12 will interpret the MSISDN and determine that it is destined for enabler 130 located in Mexico and not for the enablers 116 and 118 located in Columbia and Peru, respectively. The service delivery hub 12 then establishes a VPN tunnel to the enabler 130 located in Mexico and will prevent access to other networks. This limited but direct access may be monetized by the enabler and the network operator.

The service delivery hub 12 operates based on a series of service level agreements (SLAs) between various parties and the network operator. The service delivery platform 12 encapsulates access to the network enablers, OSS/BSS enablers, third party provided enablers and ASP applications. The service delivery platform 12 provides an application service creation gateway which provides standard APIs and software development kits (SDKs) to third party application providers. The service delivery hub 12 provides management functions for partners and aggregators, such as authentication, hosting, SLA policy control, service routing, limited charging, messaging, usage billing, settlement, monitoring, and reporting.

Figure 2:
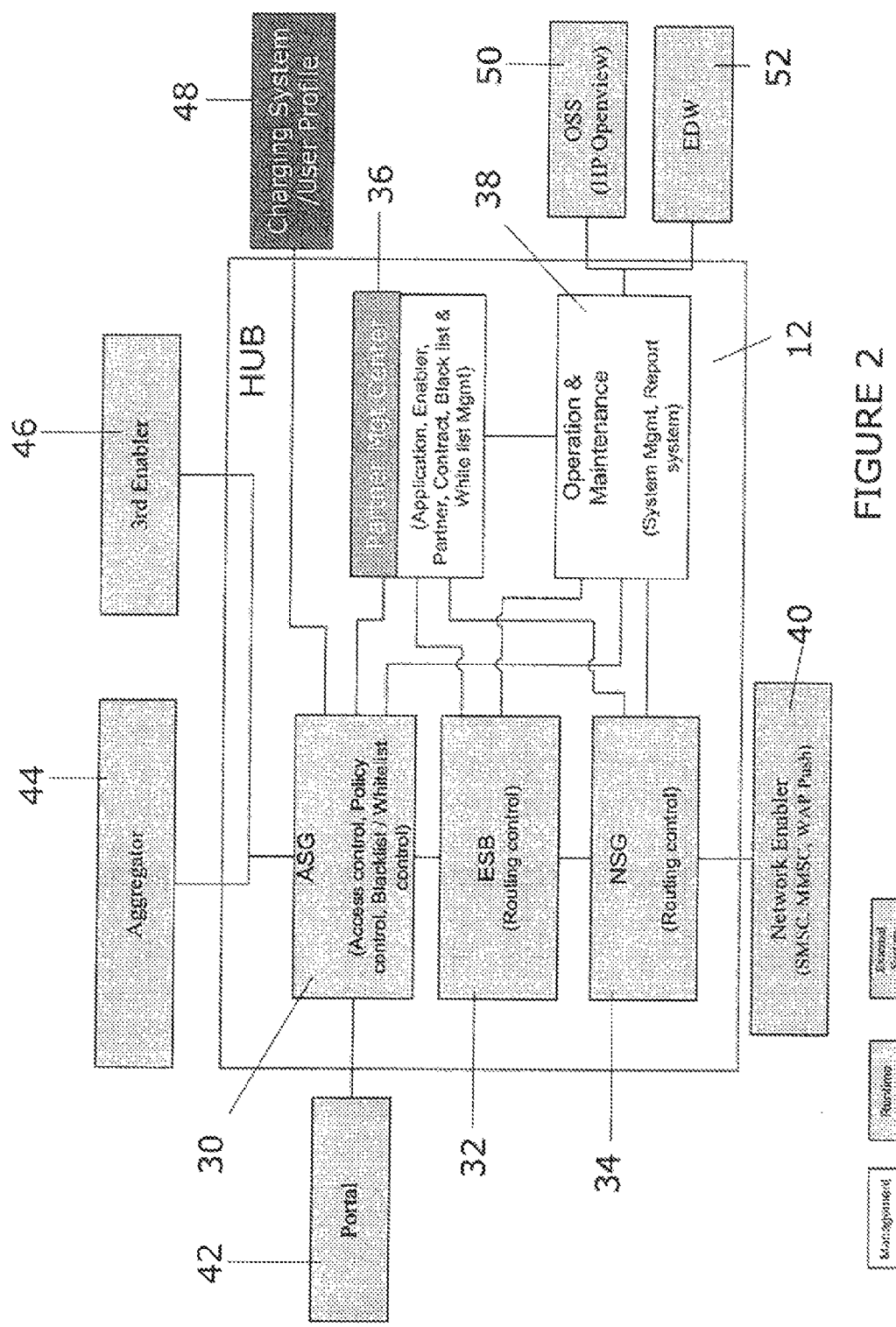
FIG. 2 is a block diagram illustrating the functions of the service delivery hub and the interfaces open to third parties.

With reference to FIG. 2, an exemplary service delivery hub includes 12 functionality such as application service gateway (ASG) 30, enterprise service bus (ESB) 32, network service gateway (NSG) 34, partner management center 36, and Operation & Maintenance 38. External to the service delivery hub 12 may be HP Openview 50 which may be an implementation of an OSS supporting the operation and maintenance 38. ASG 30 provides access control, policy control, and blacklist/whitelist control.

Portal 42 provides an external link which uses the ASG 30 functionality to control access to the service delivery hub and further to authenticate users. The portal function 42 of the service delivery hub 12 provides for the sales and distribution of content and services, including third party applications. Specific functionality may include device management and rendering, a recommendation engine, detailed application descriptions, product categorization, multi-language support, sales and revenue settlement reports, advertising associations and multi-network footprint.

The charging gateway "/User Profile Server 48, shown in an exemplary embodiment as outside of service delivery hub 12 but interfacing therewith, provides storage media for user information and profiles. Access to the charging gateway/User profile server 48 by the ASG function 30 is routed through the ESB 32. Additional access and control interfaces are provided within the ASG function 30 for access by aggregators 44 and third party enablers 46.

The access control function within ASG 30 provides services such as service provider and user authentication and verification. The ASG 30 allocates and prioritizes service delivery hub 12 resources for the application accessing the service delivery hub 12. The service level policy control function enables the service delivery hub 12 to control and, if necessary, limit the system resources available to a third party application to prevent system overloading. By controlling the system resources through the service delivery hub, the network resources are able to be allocated along a broad range of applications. Policy control also provides for monetization at the service level or the parameter level for access to all network enablers. The scarcity of or availability of resources depending on time of day and loading algorithms provide variable and cost effective price strategies to third party developers and enablers. Quality of service and pricing associated therewith may also be provided by the policy control function.

Routing control functionality is provided by enterprise service bus (ESB) 32. This includes developing or configuring the routing policy. The routing control functionality of the service delivery hub 12 enables the third party providers to interface with the network or multiple networks at one and only one access point. The service delivery hub 12 is preferably able to interpret the MSISDN to determine the local network operator involved in the transaction and route accordingly. For example, the ESB 32 may route based on MSISDN in a GSM environment. The routing may also be determined based on location, including country or market, or a sales portal catalog.

The network services gateway (NSG) 34 within the service delivery hub 12 interfaces with network enablers 40 to provide access to network functionality, including, for example, SMSC 16a, MMSC 16b, or WAP GW 16c or any other network elements or systems. The NSG 34 protects the network resources from overloading, manages all requests against an element and weighs any new requests coming in against the configured load capacity of any element. If multiple elements are available, it will load balance the requests across the multiple elements. For example, if there are multiple SMSCs 16a in a given region, if one SMSC 16a is overloaded, the NSG 34 may transfer load to another SMSC 16a.

Figure 4:
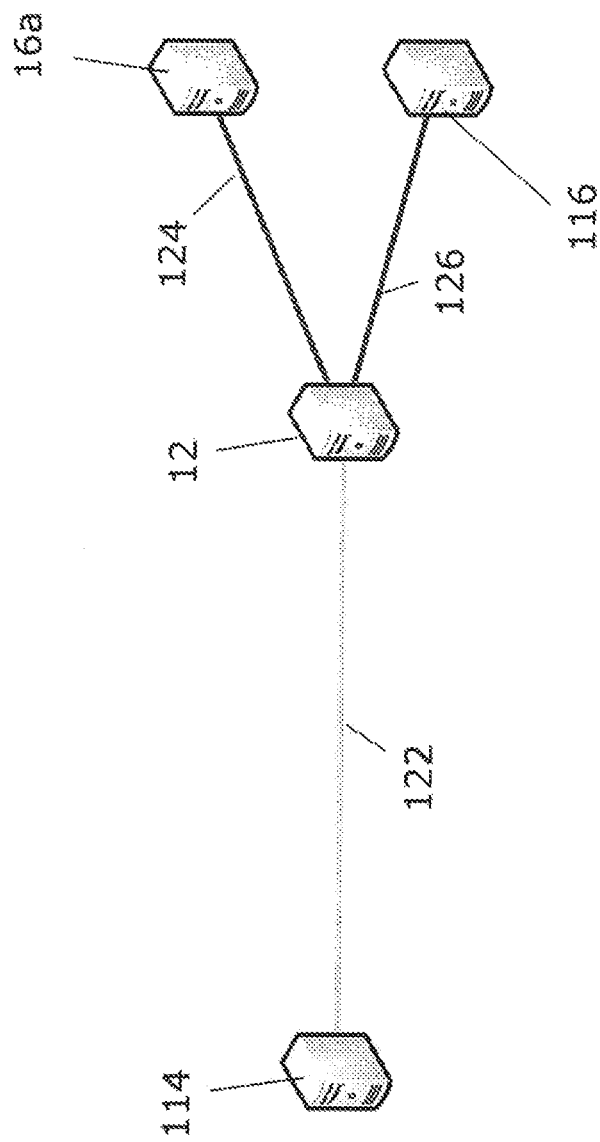
FIG. 4 is a block diagram illustrating the accessing of an enabler through the service delivery hub by a third party.

The service delivery hub 12 includes a partner management function 36 which include the contracting capability between the network operators and the enabler providers and the network operators and the ASPs. The partner management functions 36 include the ability to allow an administrator to configure contracts and SLAs for utilizing thea charging module for charging transactions. for example, the charging subsystem 116 in FIG. 4. In that example, a third party 114 may access the service delivery platform 12 using the SOAP protocol interface 122 to access the SMSC subsystem 16a located in Columbia under contract. The service delivery platform 12 will access the charging subsystem 116 for charging and reconciling the cost of such access to the third party (or its customers). In this example, the partner management function 36 plays the role of establishing the contracts and SLAs in the network. The act of establishing the connectivity and the routing is performed by the ASG 30 and ESB 32 for the charging reference and the ASG 30, ESB 32, and the NSG 34 for the SMSC reference. From a third party's development standpoint, the third party system 114 will receive an API for the desired enabler, in this example, the SMSC 16a in Columbia. The third party would then develop the program using the API on the third party system 114 and test the program using the service delivery hub 12 test environment. Once development is completed, the third party system 114 will complete its purchase of access to the enabler and cut over to the production version of the service delivery hub 12.

Referring again to FIG. 2, the operations and maintenance functionality 38 of the service delivery hub 12 includes system management and reporting functions and provides interfaces to the operational support systems (OSS) 50 and electronic data warehouses (EDW) 52. The operations and maintenance function 38 is to support the platforms from a performance, availability and trouble-shooting perspective. Alarms will be sent to the OSS 50 when subsystems of the overall architecture are unavailable. The settlement functionality lies within the partner management center 36 of the service delivery hub 12 and provides allocation of revenue and reports covering various aspects of sales. This may include asset sales such as applications or enabler usage. Report features may include multi-currency and multi-country settlements. Moreover, there may be recursive settlement functionality for multi-party transactions. The reporting functionality within the partner management center 36 of the service delivery hub 12 may be customized for a variety of applications and enablers. For example, reports may include application service provider settlements, application service provider traffic, enabler provider settlement, enabler provider traffic, traffic TPS reports, error, availability and sales portal reports.

The service delivery hub 12 provides the added functionality of monetization of third party applications and services. For example, the network enablers are provided the tools to be able to charge at the parameter level for access to all network enablers. Using the access control and other policy rules, the network operator, on behalf of third party enabler providers, is able to throttle or gate applications based on TPS or total volume, time of day and other parameters. Moreover, the network operators may apply quality of service to the network-based APIs and third party supplied APIs.

With respect to third party enablers, the network operator may pay or revenue share for the use of such enablers. The network operator may sell access to the third party enablers. Finally, the network operator may recursively charge and settle with third party enablers.

In operation, the ASP may enter into a contractual relationship with a mobile network operator through which contract the network operator will provide functionality and interfaces defined by a set of SLA's to the ASP. The ASP incorporates the functionality into the application. The application is then either sold on the network operator's portal 42 (or multiple portals located in different geographic areas) or sold directly to the consumer.

Continuing with an operational view, an enabler, either a third party network enabler or a third party application enabler, may also enter into a contractual relationship with the mobile network operator. The enabler may provide a set of interfaces to the service delivery hub 12 on a revenue share basis to be used by third party ASPs using the service delivery hub 12.

There are many examples of this monetization business model. For example, application service providers utilizing the service delivery hub may contain products or services offered to the customers and include contractual terms with the network operator through which the network operator and the ASP both share in the monetization of an application. For example, video game developers may offer a gaming system to its customers on a storefront accessible through the portal 42 of the service delivery platform. The game may include, for example, a free trial version downloadable to a mobile device with an option to purchase the full version. The network operator will receive the order from the customer, deliver the full version of the game to the customer, receive payment from the customer, and then share the revenue generated with the ASP.

According to another exemplary utilization of the invention, an enabler may provide messaging services through an API that is made available to the ASP developing a video gaming application. For example, the enabler may offer two products to the ASP for a gaming application, sending and receiving SMS messages and sending and receiving MMS messages which permit users of the game to text or video chat while playing the game. For each, the ASP may charge its customers either a flat fee or a use-based fee or build the fee into the cost of the game. The network operator may charge the ASP a set-up fee, a maintenance fee, or a service-level based fee for use or a flat-rate fee for use.

In another exemplary embodiment, an enabler may provide a service to the network operator on behalf of third party ASPs. For example, the enabler may provide mobile advertising services, including getting advertisements, posting advertisements and tracking advertisements. Depending on the contractual relationships, the parties involved in the transaction may share the advertising revenue either two ways, i.e., the enabler provider and network provider, or three ways, including the ASP.

Application service providers may sell anything using the network operator's storefront or its own storefront. In addition to on-device applications in which applications such as games are downloadable directly onto a mobile device, the service delivery platform also supports web-hosted based applications which are stored on network and accessed by mobile devices through a portal. The service delivery hub permits the ASP to host its own web-hosted applications or have them hosted in a network cloud operated by the network operator. In the latter case and using the example of a gaming system, the gaming system may be hosted in the network cloud and offered to subscribers on a subscription (fee per month) basis. As such, the service delivery hub 12 permits the ASP to access and post its offering in one location, while outsourcing to the network operator the hosting, accounting, fulfillment, collection and settlement functions, with a revenue share used to monetize the offering.

In the ASP model, there may be aggregators of content that utilize the services of the network operator through the service delivery hub 12. Content to be aggregated may be obtained from ASPs, for example, a gaming aggregator may offer multiple games from a variety of ASPs on a single storefront, either its own storefront or a storefront accessible through the network operator portal. Alternatively, such aggregators may make their content available to ASPs or directly to customers of network operators. For example, content aggregators may collect and offer music under contract with recording studios and make that music content available to game developers for a fee. In either case, the aggregators utilizing the service delivery hub 12 are able to deploy a single interconnection and achieve distribution across a wide array of network operators in diverse geographical locations.

Enablers may provide access via application programming interfaces (APIs) to a wide range of functions. On the portal side, API's may be provided for functions including ownership checking, purchasing, quoting, delivery, catalog discovery, device checking, advertising and subscription notification. Network API's may be provided for charging, customer profiling, SMS, WAP Push and MMS. External API's may include searching functionality, while service delivery hub API's may include alarm notification. Moreover, external API's may be used by third party developers to create their own enablers that can be resold to other providers or other developers or embedded as a library in an SDK.

Figure 5:
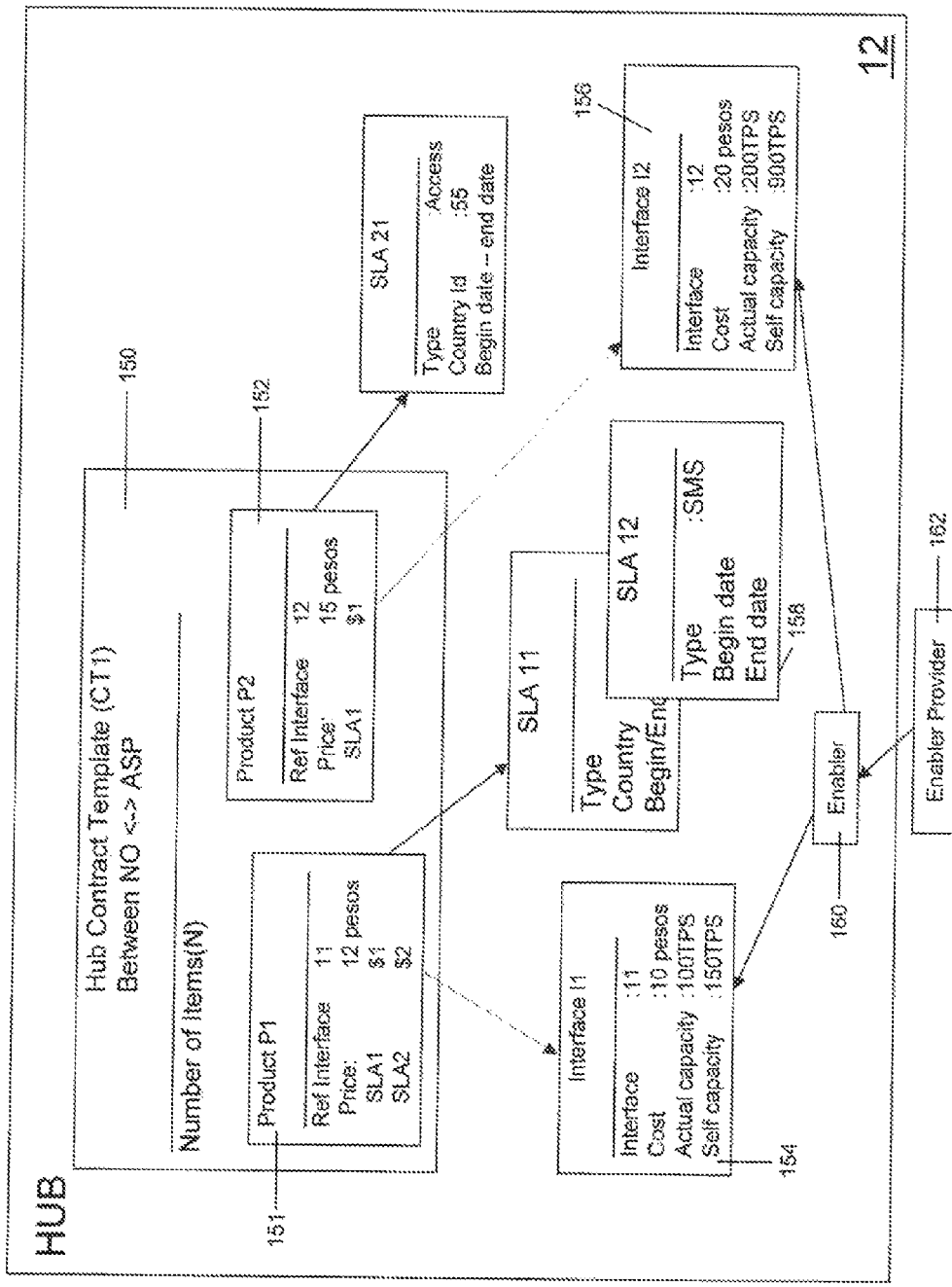
FIG. 5 is a block diagram illustrating an example of the functions of the business process between the network operator and an ASP.

With reference to FIG. 5, there is shown a block diagram illustrating an exemplary embodiment of the functions of the business process implemented by specially programmed computer servers. The transaction is between the network operator and an ASP as supported by the service delivery hub 12. The server associated with an ASP will access the service delivery hub 12 to complete a contract template 150, which in this example, contains a request to purchase two products, P1 151 and P2 152. The template sets forth contractual terms including the product and the price and any applicable SLAs 158 for each of those products 151 152. Each product then is referred to an application programming interface, shown as API 154 for product P1 151 and API 156 for product P2 152. Each of those APIs are provided by a third party enabler 162 through an enabler function 160 located within the service delivery hub 12, and in this example, each also has an associated cost. With this business relationship established, the ASP then may utilize the service delivery hub 12 in the execution of its business plan.

Onboarding

An advantage of the above-described service delivery hub 12 is to provide application developers with a single access point to develop, manage and distribute their applications across multiple locations and networks. According to one embodiment of the invention, there is a process for onboarding an application developer onto the service delivery hub 12 and automating the flow-through of the registration process and certification process as well as providing application management through external distribution channels. The method provides a single user interface for an application service provider to manage all access to the network operator's network and to manage distribution of the developer's applications.

The service delivery hub 12 may also manage the synchronization of account information with external distribution services for the developed applications. As such, the developer may manage all account information from a single user interface. By configuring the service delivery hub 12 to match data elements to those of the external distribution system, the service delivery hub 12 may synchronize between the two platforms. The service delivery hub 12 may also manage the transfer of application metadata as may be utilized by the external distribution by pre-configuring the rules for the metadata creation into the service delivery hub 12. The service delivery hub 12 may automate the file transfer of the binary (or the metadata) from its platform to the external distribution system.

Figure 6:
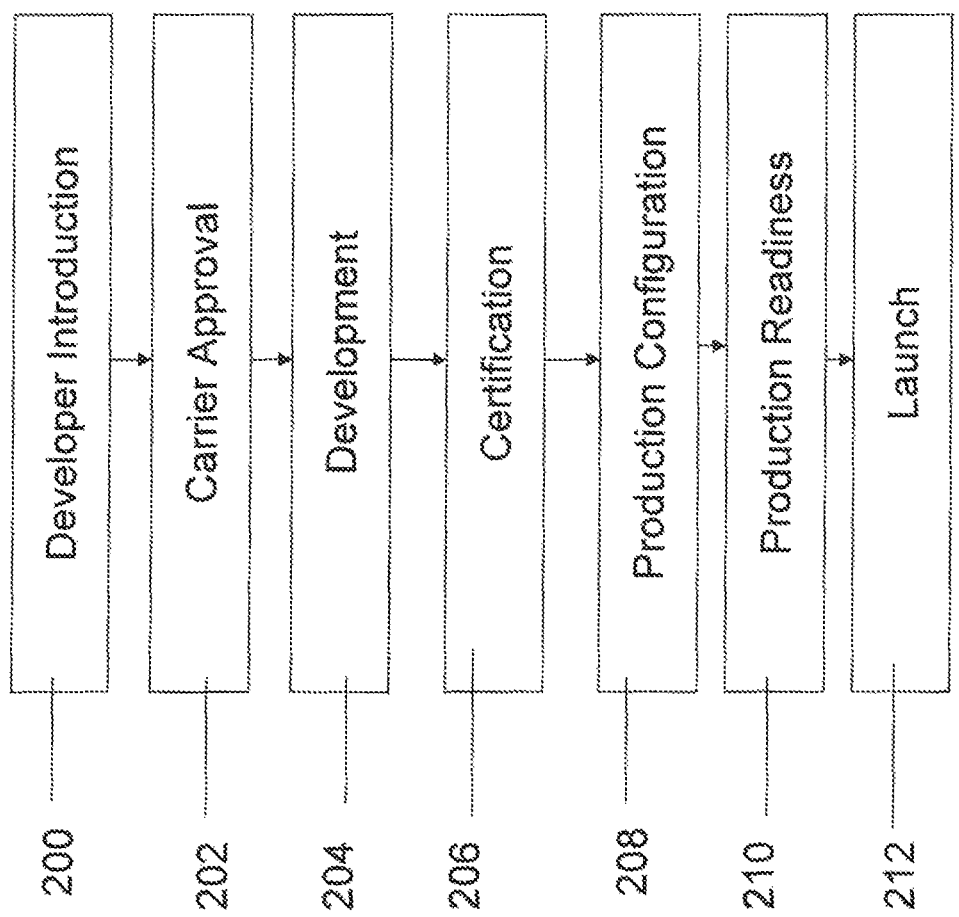
FIG. 6 is a flow chart of an exemplary process for developer onboarding to a sales distribution channel.

With reference to FIG. 6, there is shown an exemplary flow chart of a process for developer onboarding. At step 200, there is shown the developer introduction. This process may include steps such as the developer registering itself with the network operator, preferably through a network operator's website. At this point, the developer may gain access to basic information about the developer program, including documentation, access to forums and blogs, and other information germane to the developer's onboarding program. The forums and blogs may be monitored by the network operator. Registration will continue with the network operator and developer agreeing to a user identification and password combination which permits the developer to gain the required assess to the service delivery hub 12. A questionnaire may be provided for the developer to convey basic information to the network operator. The network operator will compile the information and evaluate the information.

The process continues at step 202 identified as carrier approval. The carrier will evaluate the information and provide approval based on a set of criteria, examples of which include but are not limited to, business case development, network cost modeling, carrier service delivery hub SLA design, and the network operator contract design. The carrier may apply the business development process to the developer's request, considering, for example, the current and future capacity of the service delivery hub 12, the current and future network capacity, and business case development to support capacity upgrades. At this point, the network operator will prepare the contracts and SLA documentation to be executed by the developer. Approval by the network operator will finalize the developer onboarding process in the network operator partner management center which may, for example, be the partner management center 36 functionality provided by the service delivery hub 12. This in turn will establish the access and authentication to the network resources or services negotiated in the contract and permit the developer to proceed with development. Depending on the requested developer's access, an account may be established in the network operator's storefront as a delivery outlet for the developer.

At step 204, the development of the application proceeds. At this step, the network operator may make a development laboratory and testing environment available to the developer and assist with any connectivity testing and authentication credentials. The developer will start the development work on its own timeline with access to the network operator's documentation such as a 3rd party user's guide, a developer guide, or specific API reference guides.

With the basic development process completed, certification takes place at step 206 at the request of the developer. A pre-certification checklist may be provided which may be customized for either enabler developers or application developers. The developer will provide requested documentation supporting the application or the enabler, for example, user guides, API reference guides, or the like. The network operator may produce a test plan or request the developer to do so. For enablers, the developer may also provide the network operator with software and definitions to be loaded onto the service delivery hub 12. For enablers, the network operator may wary and install the enabler for the certification process. The network operator will evaluate the documentation and certify that it is complete and meets the standards it sets for providing to third party developers and users. At the conclusion of the certification process, the network operator will either certify the application or enabler or reject the application with an explanation of the reason for rejection.

The process continues at step 208 with production configuration. At this step, the network operator may produce a customer care checklist to establish the customer care role for the application or enabler and may include a network configuration request form for functions such as VPN or SSL. The network operator may also establish the developer as a content provider in the network operator's storefront and establish the developer's access to the network operator's management center. The developer may then complete the network configuration request forms, provide a final build of the application or enabler, including supporting documentation. For enablers, the developer may also provide the network operator with access to the enabler for troubleshooting connectivity with other third party developers. Finally, the network operator will complete the network operator service delivery hub 12 configuration, any BSS/OSS configuration that may be required, and any network operator storefront configuration that may be required.

At step 210, the process continues with production readiness. At this step, the developer may demonstrate the application or the enabler to the network operator and provide for friendly trials at launch, with the network operator providing logistics for such friendly trials. The network operator may also provide readiness reports and authorize and enable all SLAs configured in the service delivery hub 12. The network operator may also issue a certificate of compliance for the application or enabler as a quality indicator to partner networks with which the service delivery hub 12 will interface.

As step 212, the application or enabler will be launched. The network operator may produce promotional material if it chooses to self-promote the application or enabler. The network operator may choose to hand off support of the application or enabler to the support team. The network operator may also begin monitoring of the SLAs and produce periodic reports such as usage reports, trouble reports, and settlement reports. The developer's work is essentially complete and falls back into a support and customer care role.

Figure 7:
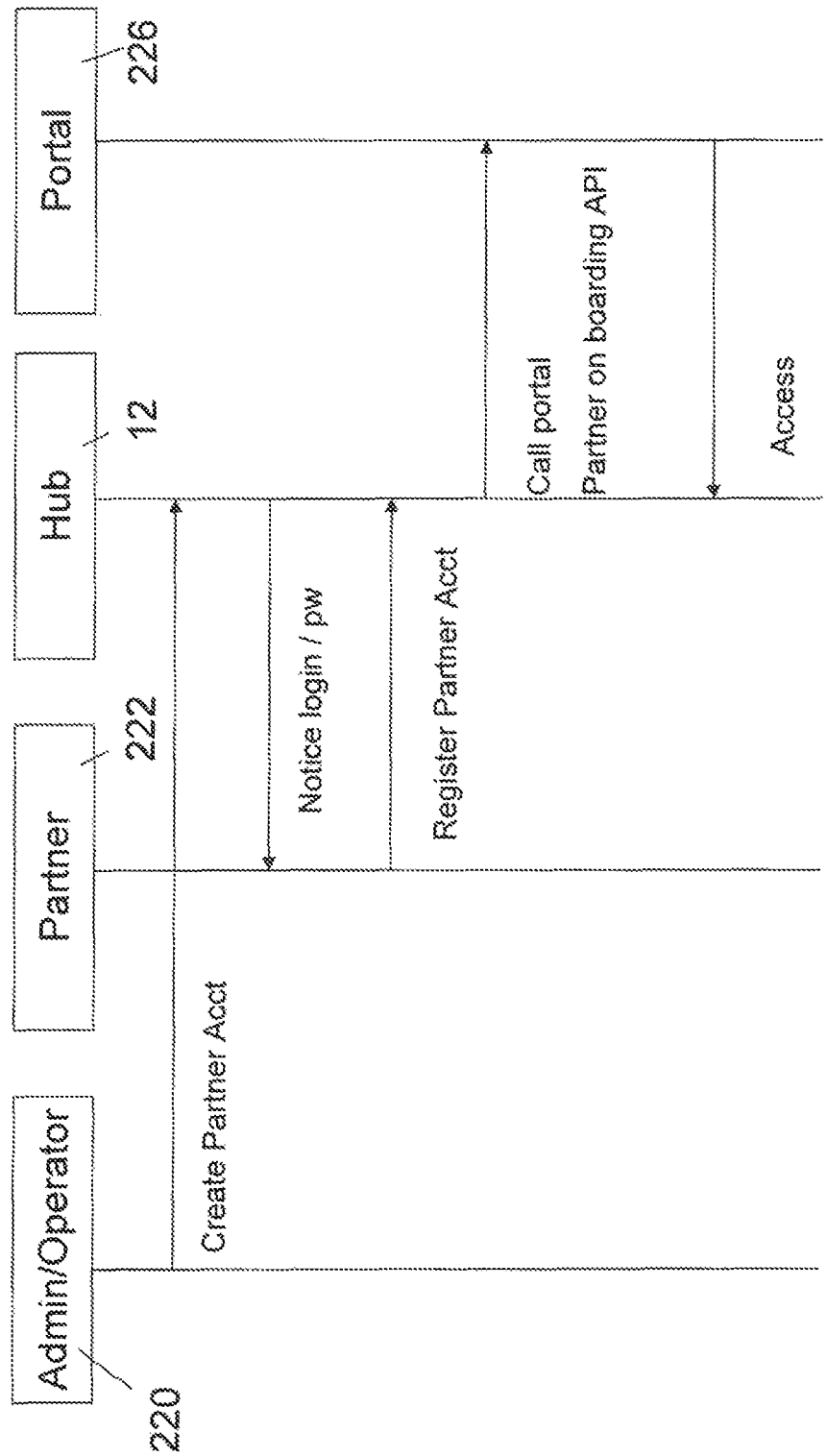
FIG. 7 is an exemplary process flow for synchronizing on-boarding with an external distribution channel.
Figure 8:
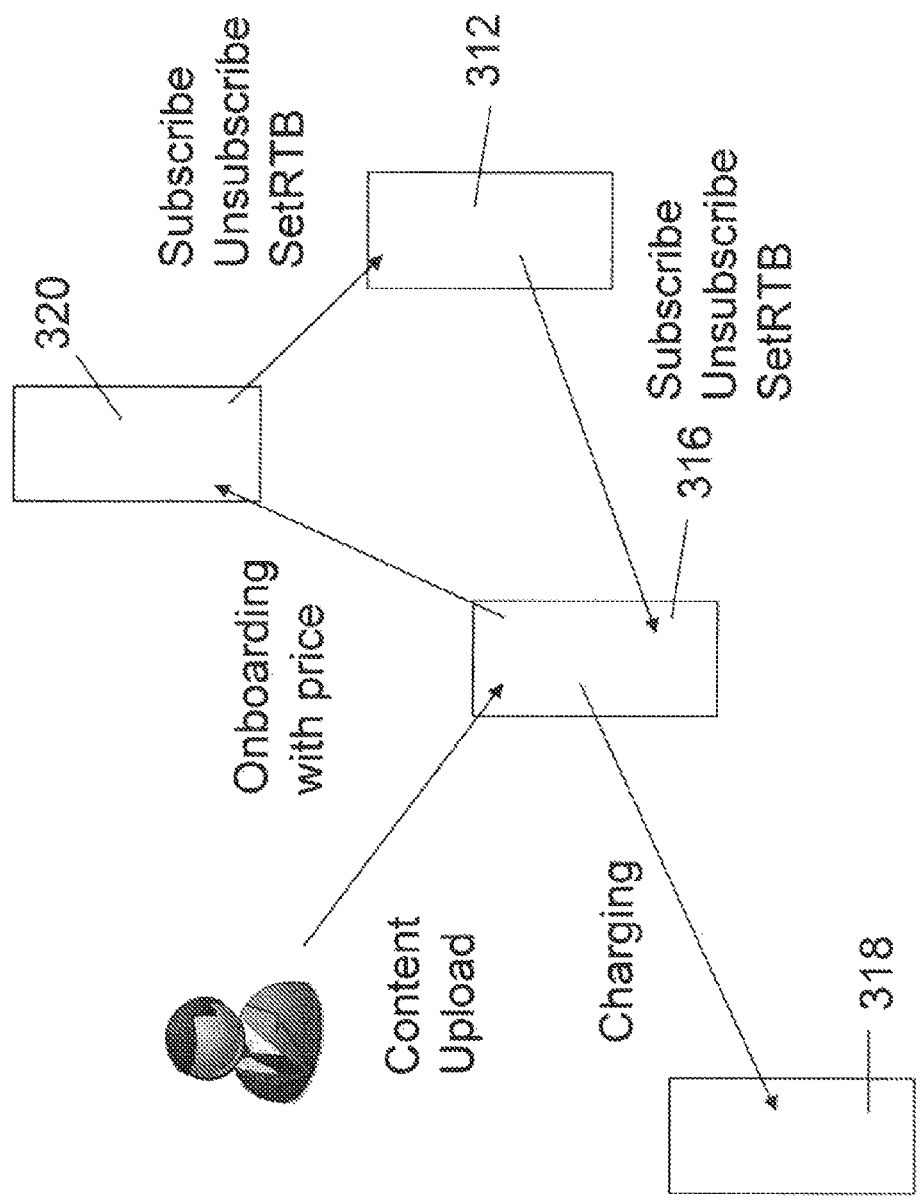
FIG. 8 is an exemplary block diagram showing the integration of a ringback tone platform within the exemplary structure of the hub system described herein.
Figure 9:
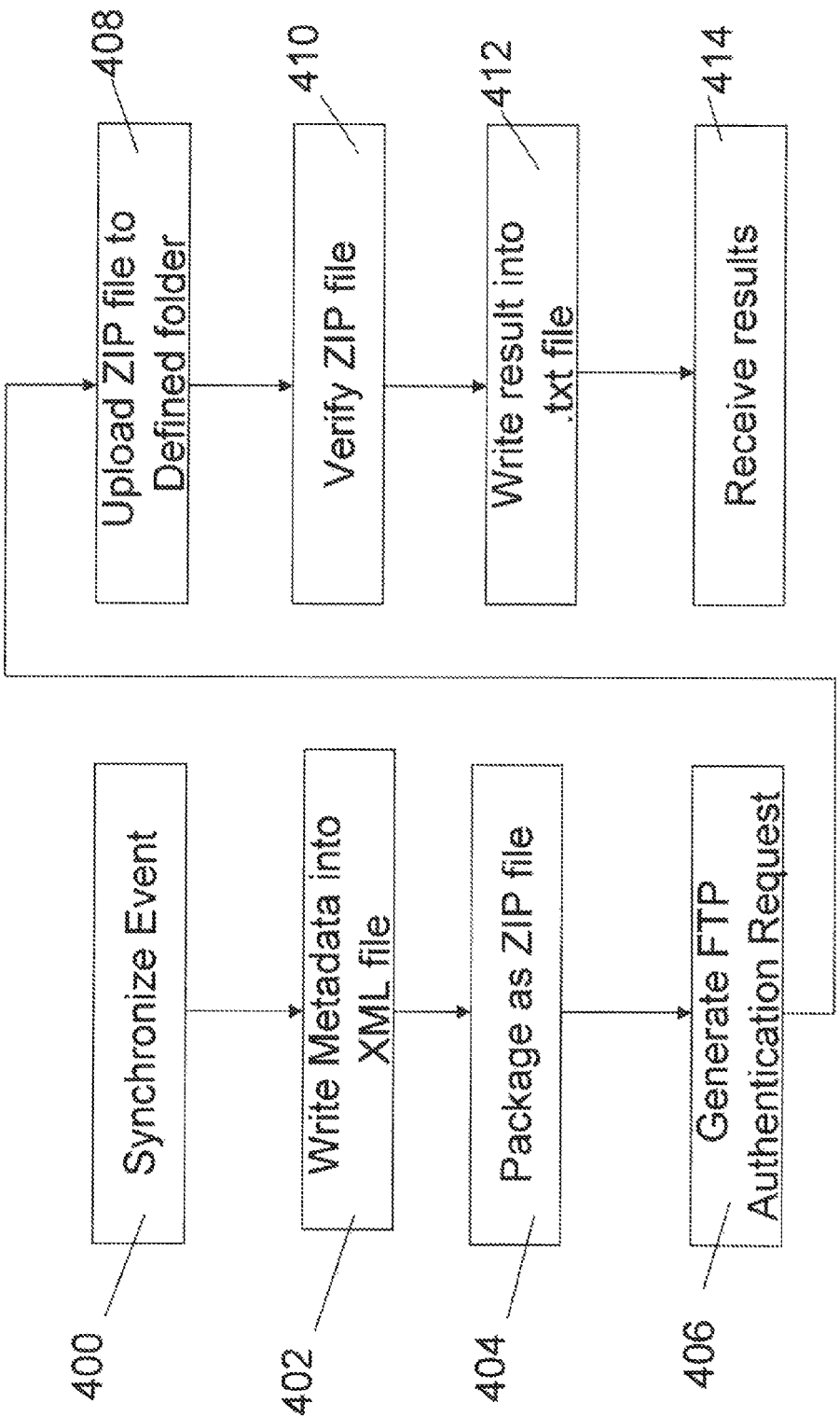
FIG. 9 is an exemplary flow chart showing the steps for uploading content to a ringback tone platform.

The ASP or the enabler provider may request that its application be made available through third party distribution channels, including the network operator storefront or other third party storefronts or through content aggregators. FIG. 7 illustrates the process flow for synchronization between the onboarding process and the third party distribution channel.

The synchronization process is preferably implemented between networked computers with registered IP addresses, which may include a computer programmed to function as an administrator of a network operator 220, the partner computer server 222, the service delivery hub 12, and a server acting as a portal 226. The administrator/operator server 220 will create a partner account in the service delivery hub 12. The service delivery hub 12 will provide login name and password information to the partner server 222 which in turn will register the partner account with the service delivery hub 12. The service delivery hub 12 will then communicate with the portal server 226 or any other end point computer and provide the partner onboarding application content metadata. For example, the ASP would upload its content metadata, bundle it per the specification of the end-point and transfer the content metadata, the transfer being accomplished, for example, via FTP. In order to do so, the ASP would have a login to both the service delivery hub 12 and the network operator storefront. The ASP supplies the user access information for the end-point machine to the service delivery hub 12 so that the service delivery hub may log onto the end point machine on behalf of the ASP and transfer content metadata. If the ASP does not have an account on that end-point system and the service delivery hub 12 is configured to establish an account on behalf of the user, then the service delivery hub 12 will automatically retrieve the user access information for the end-point machine without the ASP providing it. The end-point system may, for example, be a storefront operated by the network operator or some other third party storefront.

The disclosure also relates to the providing of ring back tones, referred to herein by the acronym "RBT". The RBT platform may continuously handle the content provider management, the content management, the pricing, the charging and the promotion of ring back tones. The content may be synchronized between the RBT platform and a portal. In that case, the portal may present the content as synchronized from the RBT platform to the end users.

Content synchronization may occur when any new content is uploaded onto RBT platform by a user or ASP and approved by network operator. Content synchronization may also occur when content is hidden by the network operator on RBT platform or when content is expired on RBT platform. With reference to Figure X, when one of the events that would trigger synchronization, such as an ringback tone upload request, is detected at step 400, metadata is written into a predefined XML file at step 402. The XML file describes both the metadata of the content as well as event related information. The RBT platform then packages this XML as a ZIP file at step 404. The RBT platform then generates the FTP authenticate request at step 406. The RBT platform the uploads the ZIP file into defined folder on the ingestion server of the portal at step 408. The portal verifies the ZIP file, finishes the ingestion process and writes the results into a txt file at step 410. The RBT platform gets the result file through the same FTP at step 412. In the case wherein the result is success, the flow is finished. But when the result is failed, the ZIP file with the same name may be uploaded again by RBT platform and the process continues until successful completion.

Figure 10:
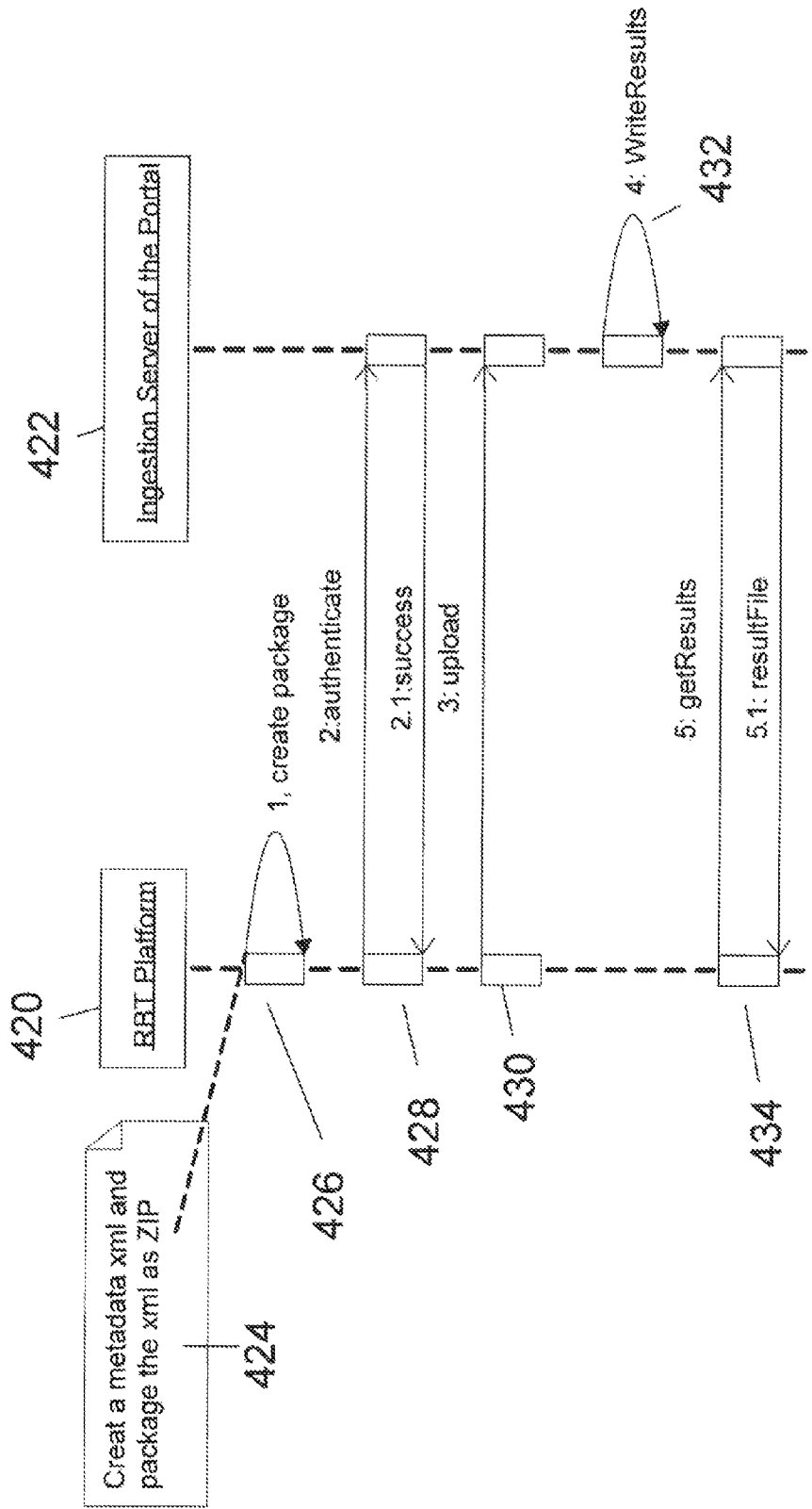
FIG. 10 is an exemplary call flow between the ringback tone platform and the ingestion server of the portal.

The RBT platform and the hub 12 may be integrated and may, for example be integrated through the SOAP API. The hub 12 may make APIs available for user management and user tone management to external programs. APIs (to be defined below) may be used for managing the ingestion and sale of the ring-back tones and shows the interaction between the RBT platform 420 and the ingestion server of the portal 422 as shown in FIG. 10. At step 424, certain metadata and files are created for uploading. The RBT platform 420 creates the RBT package at step 426. At step 428, the ingestion server 422 authenticates the request to be uploaded and returns a successful authentication message to the RBT platform 420. The file is uploaded at step 430. At step 432, the ingestion server 422 writes the results of the file upload so that is accessible. Finally, at step 434, the RBT platform 420 requests the results of the upload and receives the results that the content file upload was successful.

Figure 11:
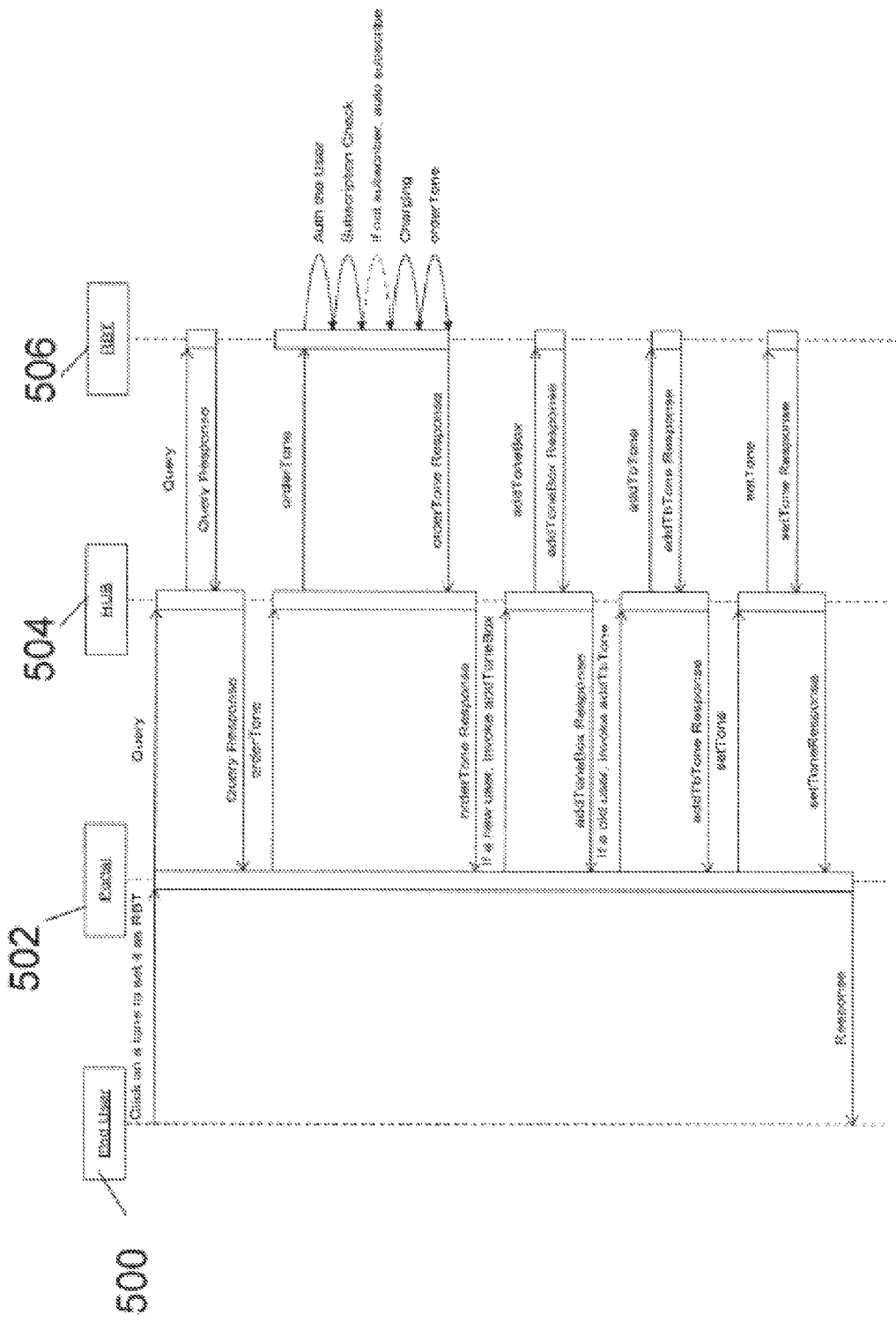
FIG. 11 is an exemplary call flow for a use case after a ringback tone is integrated into the system

With reference to FIG. 11, there is shown an exemplary call flow representing a use case between an end user 500, the portal 502 through which an end user 500 would access ringback tones, the hub 504 and the RBT platform 506. As can be shown, the end user 500 merely needs to select a ringback tone to download and await to receive a confirmation response. The interaction between the portal 502, the hub 504, and the RBT platform 506 as shown is automated. The portal 502 queries the hub 504 for the selected ringback tone. The hub 504 then identifies the RBT platform 506 where the selected ringback tone is stored through a query. Consistent with the hub architecture, there is no requirement that the portal 502 and the RBT platform 506 be on the same network and in fact the end user does not need to know where the ringback tone is stored. After a successful query, the portal 502 initiates the order process. The hub 504 passes the order request to the RBT platform 506 which may perform a series of steps to authenticate the user and/or a subscription for the user.

The remainder of the call flow in FIG. 11 is an example of a process which may be used to set up the ringback tones for use by the end user 500. If the end user 500 is a new user, a tonebox is created and the tone stored therein. If the end user 500 is an existing user, the tone is added to the user's existing tonebox. Finally, the ringback tone is set for the user.

Exemplary APIs which may be used to implement ringback tones in a hub architecture may be found in the following list. In this list, the producer is the originating server and the consumer is the designated server.

| API | Producer | Consumer | Description |
| --- | --- | --- | --- |
| Content onboarding | Portal | RBT | Onboard the content from the RBT (with suggested price and preview binary) to Portal through FTP. |
| Music Box Onboarding | Portal | RBT | Onboard the tones bundle - music box to portal with suggested price |
| Content Update | Portal | RBT | Update the metadata/price/preview for one item of content |
| Promotion sync | Portal | RBT | Synchronize a promotion definition onto the portal |
| Subscribe | RBT | Hub | Subscribe RBT service for a specific user |
| Unsubscribe | RBT | Hub | Un-subsribe RBT service for a specific user |
| Set RBT | RBT | Hub | Set the ring tone or music box as the ring back tone for the user |
| Order Tone | RBT | Hub | Allow the user to subscribe to a tone through external portal |
| reorder Tone | RBT | Hub | Allow the user to extend the subscription for a tone through an external portal |
| Add Tone | RBT | Hub | Add a tone into a tone box for a specific user |
| Set Tone | RBT | Hub | Set the tonebox for a user |
| RBT Expire notification | Portal | RBT | Notify portal that the current ring back tone is expired for a particular user |
| Subscription query | Portal | RBT | Query the subscription information and the ring back tone purchase information |

While the service delivery hub and in particular the onboarding methodology for developers and synchronization between the developers and third party portals, and specifically ringback tone platforms, has been described in connection with the various embodiments of the various figures, it is to be understood that other similar embodiments can be used or modifications and additions can be made to the described embodiment for performing the same types of functionality in service delivery without deviating therefrom. For example, one skilled in the art will recognize that the service delivery hub 12 may be located anywhere with portal access from multiple locations. The service delivery hub 12 may provide access to one or multiple networks simultaneously and block access to other networks. The service delivery platform 12 may be scaled to provide access to a plurality of networks either domestic or international. Any type of telecommunications network may be supported, including but not limited to GSM, CDMA, EDGE, 3G, 4G, LTE or any other wireless network. While VPN tunneling to connect to the plurality of networks has been described, other types of access and communications are contemplated, including SSL. The particular contracts with the developers and the configurations between the ASP developers and the service delivery hub 12 and other external networks may be varied from the exemplary embodiments described herein. Therefore, the service delivery hub 12 should not be limited to any single embodiment, but rather should be construed in breadth and scope in accordance with the appended claims.

What is claimed:

1. A method comprising:
   generating, by a network operator, an offer for third-party content on a portal of the network operator, the portal operating on a first network, the first network associated with the network operator, the third-party content comprising a ring-back tone;
   receiving, by the network operator, an order from a subscriber of the first network, the order for the third-party content via the portal;
   retrieving, by the network operator, the third-party content from a ring-back tone platform, the ring-back tone platform operating on a second network different from the first network;
   storing the ring-back tone in a tonebox associated with the subscriber; and
   setting, by the network operator a subscriber-specific ringback tone to the ring-back tone,
   wherein the network operator does not operate the second network.

2. The method of claim 1 wherein the offer is generated on a plurality of portals.

3. The method of claim 2 wherein the plurality of portals is distributed across a plurality of networks.

4. The method of claim 1, further comprising:
   determining that a request for the content is associated with a subscription; and
   validating the subscription.

5. The method of claim 4, wherein:
   the ring-back tone platform determines that the request is associated with the subscription; and
   the ring-back tone platform validates the subscription.

6. The method of claim 1, further comprising:
   determining, by the ring-back tone platform, if a requester requesting the content is a new requester or an existing requester; and
   based on the requester being a new requester: generating the tonebox.

7. A portal operated by a network operator, the portal comprising:
   a processor; and
   memory comprising instructions that cause the processor executing the instructions to effectuate operations comprising:
   generating an offer for third-party content, the portal operating on a first network, the third-party content comprising a ring-back tone;
   receiving an order from a subscriber of the first network, the order for the third-party content;
   retrieving the third-party content from a ring-back tone platform, the ring-back tone platform operating on a second network different from the first network;
   storing the ring-back tone in a tonebox associated with the subscriber; and
   setting a subscriber-specific ring-back tone to the ring-back tone,
   wherein the network operator does not operate the second network.

8. The portal of claim 7 wherein the offer is generated on a plurality of portals.

9. The portal of claim 8 wherein the plurality of portals is distributed across a plurality of networks.

10. The portal of claim 7, the operations further comprising:
    determining that a request for the content is associated with a subscription; and validating the subscription.

11. The portal of claim 10, wherein:
    the ring-back tone platform determines that the request is associated with the subscription; and
    the ring-back tone platform validates the subscription.

12. The portal of claim 7, the operations further comprising:
    determining, by the ring-back tone platform, if a requester requesting the content is a new requester or an existing requester; and
    based on the requester being a new requester: generating the tonebox.

* * * * *